(No Model.)
A. MEYER.
BICYCLE TIRE.
No. 513,433. Patented Jan. 23, 1894.
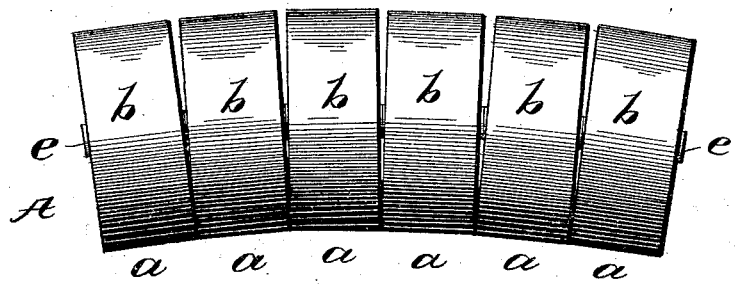
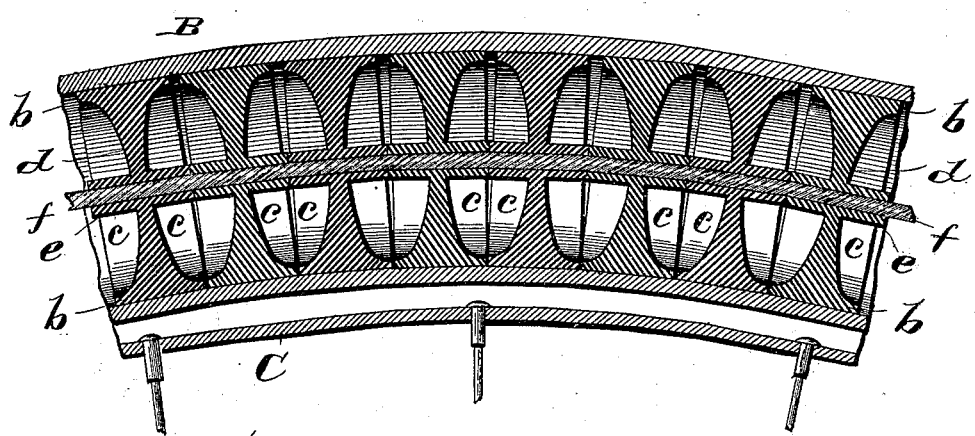
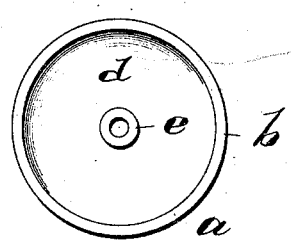
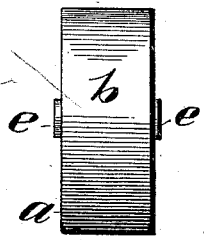
Witnesses
Inventor
August Meyer.
By D. C. Reinohl
Attorney

UNITED STATES PATENT OFFICE.

AUGUST MEYER, OF BALTIMORE, MARYLAND, ASSIGNOR OF ONE-HALF TO FREDRICK W. KLIPPER, OF SAME PLACE.

BICYCLE-TIRE.

SPECIFICATION forming part of Letters Patent No. 513,433, dated January 23, 1894.

Application filed April 29, 1893. Serial No. 472,414. (No model.)

*To all whom it may concern:*

Be it known that I, AUGUST MEYER, a citizen of the United States, residing in the city of Baltimore and State of Maryland, have invented certain new and useful Improvements in Bicycle-Tires; and I do hereby declare the following to be a full, clear, and exact description of the invention, such as will enable others skilled in the art to which it appertains to make and use the same.

My present invention relates to tires for bicycles and like vehicles and has for its object certain improvements in construction to secure the maximum of elasticity with the minimum of risk of diabling the machine by rupturing or puncturing the outer surface of the tire.

The invention will be fully disclosed in the following specification and claims.

In the accompanying drawings which form part of this specification Figure 1 represents a side elevation of part of the core or body of the tire; Fig. 2 a vertical longitudinal section of part of the rim of a wheel, the core or body of the tire and its outer cover or casing; Fig. 3 an end view of one of the sections of the core, and Fig. 4 a side view thereof.

Reference being had to the drawings and the letters thereon, A indicates the core or body of a tire composed of elastic sections $a$, preferably of rubber, compressible circumferentially or transversely from their peripheries toward their centers. The sections $a$ consist of disks or short cylinders having a broad rim or outer bearing surface $b$, and concave ends $c\ c$ which have a web $d$ in the center of the section; which web is reduced in cross sectional area gradually from the rim $b$ to the hub $e$ to impart the maximum of elasticity to the web, and locate the greatest degree of elasticity near the transverse center of the tire. The hub $e$ of each section $a$ is shown of a length equal to or slightly in excess of the width of the rim of the section, and when the sections are assembled in the cover or casing B the hubs of each section abut a hub of each adjacent section and prevent lateral movement or buckling of the web $d$ and consequent collapse of the tire.

The casing B may be made of rubber or rubber and cloth combined or of canvas.

To assemble the sections $a$ of the core, they may be strung upon a cord $f$ which passes through the hubs $e$ and drawn through the cover or casing B, when the casing is secured at its ends to form a tire in the usual manner of connecting flexible tires.

The tire is supported in a rim C of any approved construction.

By the construction shown, a tire of great elasticity is produced and the tire is not subject to being disabled or seriously affected by the casing being punctured as in the use of inflated tires, and the casing may be renewed as it becomes worn without changing the core or body of the tire.

Having thus fully described my invention, what I claim is—

1. A tire consisting of a core composed of solid and connected compressible sections and an inclosing casing.

2. A tire consisting of a core composed of solid compressible sections having a central web and inclosing casing.

3. A tire consisting of a core composed of solid compressible sections having a central web and concave ends, and an inclosing casing.

4. A tire consisting of a core composed of compressible sections having a central web of varying thickness, and an inclosing casing.

5. A tire consisting of a core composed of solid compressible sections having a central web and a hub; and an inclosing casing.

6. A tire consisting of a core composed of solid compressible sections having a central web and a hub, and a cord extending through said hubs; and an inclosing casing.

7. A tire consisting of a core composed of solid compressible sections having a web and means for preventing lateral displacement of said web; and an inclosing casing.

In testimony whereof I affix my signature in presence of two witnesses.

AUGUST MEYER.

Witnesses:
 FELIX R. SULLIVAN,
 DECATUR H. MILLER, Jr.